UNITED STATES PATENT OFFICE.

WILLIAM JOHN HOFFMAN, OF NEW YORK, N. Y., ASSIGNOR TO UNITED STATES MOTOR FUEL CORPORATION, OF NEW YORK, N. Y., A CORPORATION OF DELAWARE.

PROCESS FOR THE TREATMENT OF HYDROCARBON DISTILLATES.

1,367,968. Specification of Letters Patent. Patented Feb. 8, 1921.

No Drawing. Application filed July 9, 1918. Serial No. 244,015.

*To all whom it may concern:*

Be it known that I, WILLIAM J. HOFFMAN, a citizen of the United States, residing in the city, county, and State of New York, have invented Processes for the Treatment of Hydrocarbon Distillates, of which the following is a specification.

My invention relates to a process of treating hydrocarbon distillates such as for instance kerosene oil, or what I have termed in my co-pending application Serial No. 244,016 gasolene substitutes for the purpose of making them available for motor fuel.

I have found that by adding certain chemicals to the distillate and allowing the mixture to stand that a new arrangement of the constituents is effected and that precipitation takes place. The lighter portion of the mixture is a volatile liquid suitable for fuel for internal combustion engines.

The operation of my process is as follows:

I dissolve 4 gr. picric acid with 8 oz. wood alcohol. I absorb the acetylene evolved when the water reacts with four ounces of calcium carbid in the solution of picric acid and wood alcohol, I then add one-half ounce of soluble cotton and twelve drops of anhydrous ether. The mixture is then sealed and permitted to stand for some length of time, preferably about twenty-four hours. This solution is sufficient to treat five gallons of hydrocarbon distillate. The solution is then added to five gallons of hydrocarbon distillate and the mixture sealed and allowed to stand for some length of time, preferably about 24 hours. The result is that precipitation takes place. The lighter portion after being decanted will be found to be a volatile mixture having a very low flash point and one that will not lose its volatility in handling. This mixture forms a suitable fuel for internal combustion engines.

What I claim is:

1. A process for treating a hydrocarbon distillate which consists in adding to it a solution containing picric acid and wood alcohol impregnated with acetylene gas.

2. A process for treating hydrocarbon distillate which consists in adding to it a solution formed by passing acetylene into a solution of picric acid in an alcohol.

3. A process for treating hydrocarbon distillate which consists in adding to it a solution formed by passing acetylene into a solution of picric acid in an alcohol and adding a small quantity of soluble cotton and anhydrous ether.

4. The process which consists in passing acetylene into a solution of picric acid in an alcohol, adding a small quantity of soluble cotton and an ether, allowing the solution to stand, adding it to a petroleum distillate, and separating the liquid from the precipitate formed.

5. A process for treating a hyrocarbon distillate which consists in adding to it a solution containing picric acid and wood alcohol impregnated with acetylene gas and anhydrous ether.

6. A process for preparing motor fuel which consists in adding to a hydrocarbon distillate a solution consisting of picric acid, acetylene gas absorbed in wood alcohol, and anhydrous ether, allowing the mixture to stand and removing the heavier constituents from the lighter.

In testimony whereof, I have affixed my signature to this specification.

WILLIAM JOHN HOFFMAN.